(12) United States Patent
Harman (10) Patent No.: US 7,187,365 B2
(45) Date of Patent: Mar. 6, 2007

(54) INDIC INTERMEDIATE CODE AND ELECTRONIC DEVICE THEREFOR

(75) Inventor: Robert M. Harman, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 154 days.

(21) Appl. No.: 10/814,433

(22) Filed: Mar. 31, 2004

(65) Prior Publication Data

US 2005/0219218 A1 Oct. 6, 2005

(51) Int. Cl.
*G09G 5/00* (2006.01)
*H03K 17/94* (2006.01)

(52) U.S. Cl. .................................... 345/171
(58) Field of Classification Search ............. 341/20, 341/21, 22, 28; 345/168, 169, 171
See application file for complete search history.

(56) References Cited

U.S. PATENT DOCUMENTS 6,631,501 B1 * 10/2003 Jurion et al. ............... 715/535
6,934,564 B2 * 8/2005 Laukkanen et al. ......... 455/566
2003/0007018 A1 * 1/2003 Seni et al. .................. 345/864
2005/0195171 A1 * 9/2005 Aoki et al. ................. 345/172

OTHER PUBLICATIONS

Author: Ed Bott, Woody Leonhard Title: Using Microsoft Office 2000 Date: 1999 Publisher: Que Corporation Edition: Special edition Pages.*
Bureau of Indian Standards, Indian Script Code For Information Interchange—ISCII; UDC 681.3; Apr. 1999; New Delhi, India.

* cited by examiner

*Primary Examiner*—Mark Zimmerman
*Assistant Examiner*—David Chu
(74) *Attorney, Agent, or Firm*—Sylvia Chen (57) ABSTRACT

An intermediate code and electronic device therefore uses a method for character entry that has the steps of entering a first character code into a memory buffer (320, 360, 390), entering an intermediate code into the memory buffer (310, 350, 380), entering a second character code into the memory buffer (332, 378), changing the intermediate code to one or more character codes (333, 336, 365, 375, 393, 396), and using a display engine to display one or more characters represented by the first character code, the one or more character codes, and the second character code. These intermediate codes are useful for reduced keypads where certain characters, such as ligatures, are difficult to access from the keypad.

6 Claims, 8 Drawing Sheets

| | | | | | | |
|---|---|---|---|---|---|---|
| 1 | क<br>Ka<br>0915 | ख<br>Kha<br>0916 | ग<br>Ga<br>0917 | घ<br>Gha<br>0918 | ङ<br>Nga<br>0919 | |
| 2 | च<br>Ca<br>091A | छ<br>Cha<br>091B | ज<br>Ja<br>091C | झ<br>Jha<br>091D | ञ<br>Nya<br>091E | |
| 3 | ट<br>Tta<br>091F | ठ<br>Ttha<br>0920 | ड<br>Dda<br>0921 | ढ<br>Ddha<br>0922 | ण<br>Nna<br>0923 | |
| 4 | त<br>Ta<br>0924 | थ<br>Tha<br>0925 | द<br>Da<br>0926 | ध<br>Dha<br>0927 | न<br>Na<br>0928 | |
| 5 | प<br>Pa<br>092A | फ<br>Pha<br>092B | फ़<br>Fa<br>095E | ब<br>Ba<br>092C | भ<br>Bha<br>092D | म<br>Ma<br>092E |
| 6 | य<br>Ya<br>092F | र<br>Ra<br>0930 | ल<br>La<br>0932 | ळ<br>Lla<br>0933 | व<br>Va/Wa<br>0935 | |
| 7 | श<br>Sha<br>0936 | ष<br>Ssa<br>0937 | स<br>Sa<br>0938 | ह<br>Ha<br>0939 | | |
| 8 | अ<br>A<br>0905 | आ ा<br>Aa<br>0906 093E | इ ि<br>I<br>0907 093F | ई ी<br>Ii<br>0908 0940 | उ ु<br>U<br>0909 0941 | ऊ ू<br>Uu<br>090A 0942 |
| 9 | ऋ ृ<br>Ri<br>090B 0943 | ए े<br>E<br>090F 0947 | ऐ ै<br>Ai<br>0910 0948 | ओ ो<br>O<br>0913 094B | औ ौ<br>Au<br>0914 094C | |
| 0 | ्<br>Ligature and<br>Explicit-virama<br>and Half-<br>Character<br>094D (+200[CD]) | ं<br>Anusvara<br>(nasal Cons)<br>0902 | ः<br>Visarga<br>(weak asp)<br>0903 | ँ<br>Candrabindu<br>(nasal Vowel)<br>0901 | ॅ<br>Candra<br>(short E or O)<br>0945 | ़<br>Nukta<br>093C |

*FIG. 5*

| MULTITAP | UNICODE STRING | DISPLAY |
|---|---|---|
| 610 ~ 8x1 | 0905 | अ |
| 620 ~ 4 | 0905 0924 | अत |
| 622 ~ 4 | 0905 0925 | अथ |
| 624 ~ 4 | 0905 0926 | अद |
| 626 ~ 4x4 | 0905 0927 | अध |
| 630 ~ 0x1 | 0905 0927 [Lig: 094D 200D] | अध् |
| 640 ~ 6x1 | 0905 0927 [Lig: 094D] 092F | अध्य |
| 650 ~ 8x1 | 0905 0927 [Lig: 094D] 092F 093E | अध्या |
| 660 ~ 6x1 | 0905 0927 [Lig: 094D] 092F 093E 092F | अध्याय |
| 699 ~ | | अध्याय |

FIG. 6

| MULTITAP | UNICODE STRING | DISPLAY |
|---|---|---|
| 710 ~ 1 | 0915 | क |
| 713 ~ 1 | 0916 | ख |
| 716 ~ 1x3 | 0917 | ग |
| 720 ~ 6 | 0917 092F | गय |
| 723 ~ 6x2 | 0917 0930 | गर |
| 730 ~ 5 | 0917 0930 092A | गरप |
| 731 ~ 5 | 0917 0930 092B | गरफ |
| 733 ~ 5 | 0917 0930 095E | गरफ़ |
| 735 ~ 5 | 0917 0930 092C | गरब |
| 737 ~ 5 | 0917 0930 092D | गरभ |
| 739 ~ 5x6 | 0917 0930 092E | गरम |
| 740 ~ 0 | 0917 0930 092E [Lig: 094D 200D] | गरम् |
| 750 ~ 0x2 | 0917 0930 092E [EV: 094D] | गरम् |
| 799 ~ |  | गरम् |

*FIG. 7*

| MULTITAP | UNICODE STRING | DISPLAY |
|---|---|---|
| 810 ~ 8x1 | 092F | अ |
| 820 ~ 6 | 092F | अय |
| 825 ~ 6x2 | 0930 | अर |
| 830 ~ 0 | 0930 [Lig: 094D 200D] | अ— |
| 840 ~ 0 | 0930 [EV: 094D] | अर् |
| 850 ~ 0x3 | 0930 [HC: 094D 200D] | अ— |
| 860 ~ 1x1 | 0930 [HC: 094D 200D] 0915 | अ—क |
| 899 ~ | | अ—क |

*FIG. 8*

INDIC INTERMEDIATE CODE AND ELECTRONIC DEVICE THEREFOR

CROSS REFERENCE TO RELATED APPLICATIONS

This application is related to the following U.S. Patents and patent applications:

U.S. patent application Ser. No. 10/314,650 filed on Dec. 9, 2002 by Victoria Lyustin et al. and entitled "A User Interface of a Keypad Entry System for Character Input".

The related application is assigned to the assignee of the present application, and is hereby incorporated herein in its entirety by this reference thereto.

FIELD OF THE DISCLOSURE

This disclosure relates generally to keypad entry of words, and more specifically to building words with characters that are difficult to find on a keypad.

BACKGROUND OF THE DISCLOSURE

Indic scripts, such as Devanagari, Punjabi, Gujarati, Oriya, Bengali, Assamese, Telugu, Kannada, Malayalam, and Tamil, use ligatures (also called conjuncts), which are letters formed from a combination of two or more basic letters. The shape of the ligature may, or may not, give clue to the constituting letters. For example, the Roman ligature æ indicates that the constituting letters are "a" and "e". Similar Devanagari examples include क्क(क+क) and ज्ण(ज+ण). The Devanagari ligatures क्र(र+क) and क्र(र+क), however, do not give a clear hint that the constituting letters are क and र

The numerous Indic ligatures are not generally assigned separate keys on a keypad; instead users need to build ligatures from the constituting basic letters. Thus, ligatures are difficult for users to access. Additionally, dominant Indic script standards do not promote intuitively typing ligatures in Indic languages. For example, the keypress sequence and display output for creating the ligature क्र in Devanagari using the Unicode standard can be unsettling for new users. A user would first select क(Ka), which would result in the letter क(Ka) on the display screen. Then, a user selects ्(Virama, also called Halant), which results in the character क्(Ka with explicit virama) on the display screen. Finally, the user presses र(Ra), and the क् on the display screen is replaced by the ligature क्र.

Note that after selecting the ्(Virama), an explicit virama appears with the preceding consonant on the display screen, but after pressing the र(Ra) key, the explicit virama disappears and the ligature क्र appears on the screen instead of the previous character क्. This manner of requesting something you don't want (an explicit virama) to get to something you do want (a ligature) is not intuitive to a user.

Additionally, if a user wanted to create क्र(Ka with explicit virama-Ra), it would be frustrating to see a क्(Ka with explicit virama) disappear after typing in a र(Ra). In fact, the Unicode script standard requires the entry of an additional non-visible character code (zero width non-joiner) in order to obtain क्र. Also, it would be very difficult for a user to create क्र(half character Ka-Ra); most attempts would result in the ligature क्र. The क्र requires a different non-visible character code (zero width joiner).

The Indic Script Code for Information Interchange (ISCII) standard is similar to the Unicode standard in that sometimes a user must select a virama key and see an explicit virama on a display in order to obtain a ligature that does not include an explicit virama. For the ligature क्र, the keypress sequence and display is the same for the ISCII standard as the Unicode standard. For the character क्र, a user selects the virama twice to maintain the explicit virama after the Ka: क+्+्+र=क्र. Selecting a virama twice, however, is not an intuitive action.

There is a desire to provide an intuitive method for building ligatures from constituent basic characters. Also, there is a desire for appropriate visual feedback when building ligature characters. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

When a user wants to type a character that is not easily accessed on a keypad, the user generally intuits a way to obtain that character and may try a number of ways to get that character. For example, a user may seek to create the Indic ligature क्र by pressing क(Ka), then pressing a Ligature key to indicate the desire to build a ligature, and finally pressing र(Ra) to complete the ligature क्र.

The intermediate code and electronic device therefor allows a user to build ligature characters intuitively. Also, the intermediate code and electronic device therefor permits flexibility in creating other types of character variants. In addition to Indic scripts, the intermediate code and electronic device therefor can be applied to many alphabets that include ligatures and other modified characters.

An intermediate code and electronic device therefore uses a method for character entry that has the steps of entering a first character code into a memory buffer, entering an intermediate code into the memory buffer, entering a second character code into the memory buffer, changing the intermediate code to one or more character codes, and using a display engine to display one or more characters represented by the first character code, the one or more character codes, and the second character code. This intermediate code is useful for reduced keypads where certain characters, such as ligatures, are difficult to access from the keypad.

Figure 1:
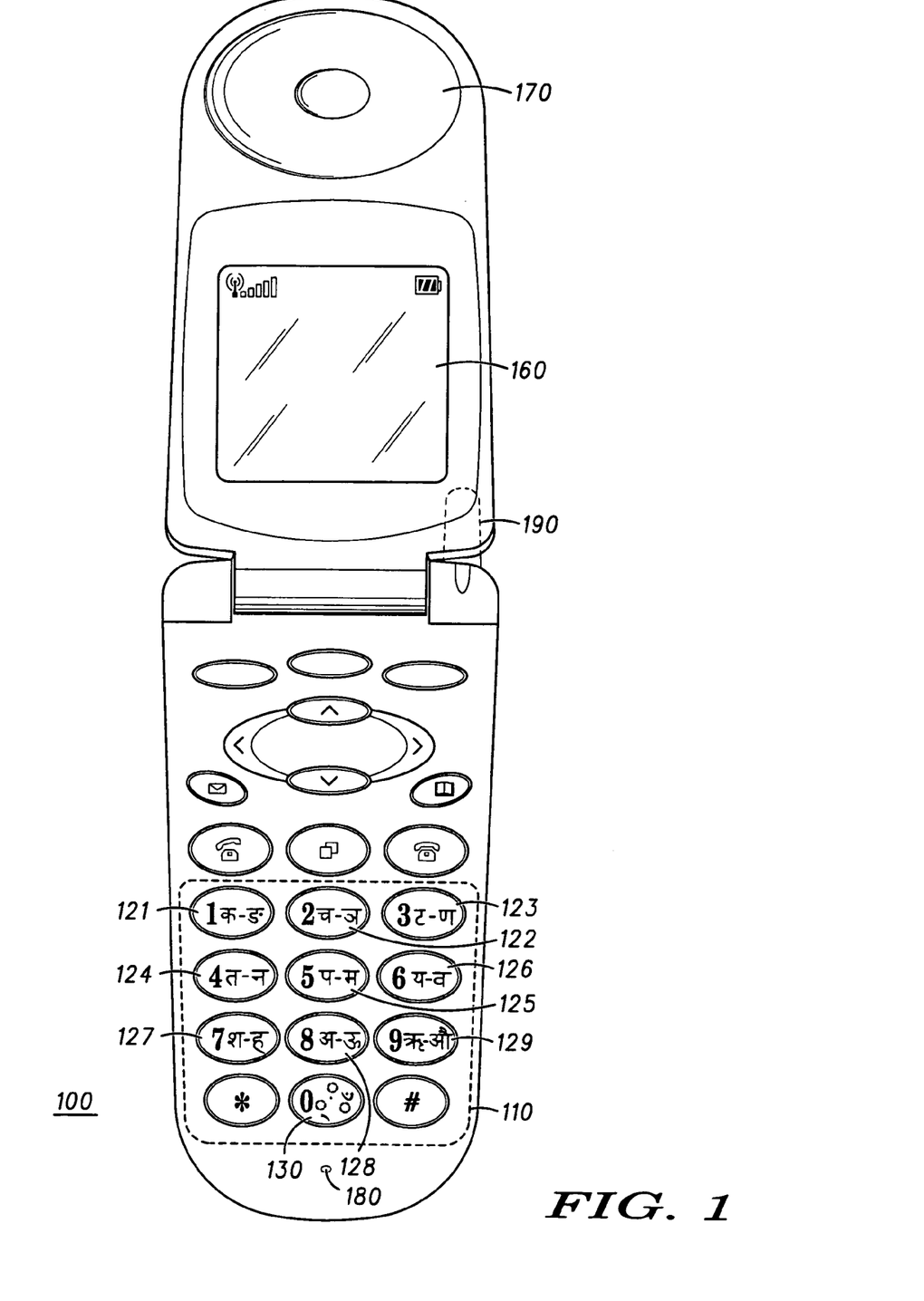
FIG. 1 shows an example of an electronic device with a display and reduced keypad.
Figure 5:
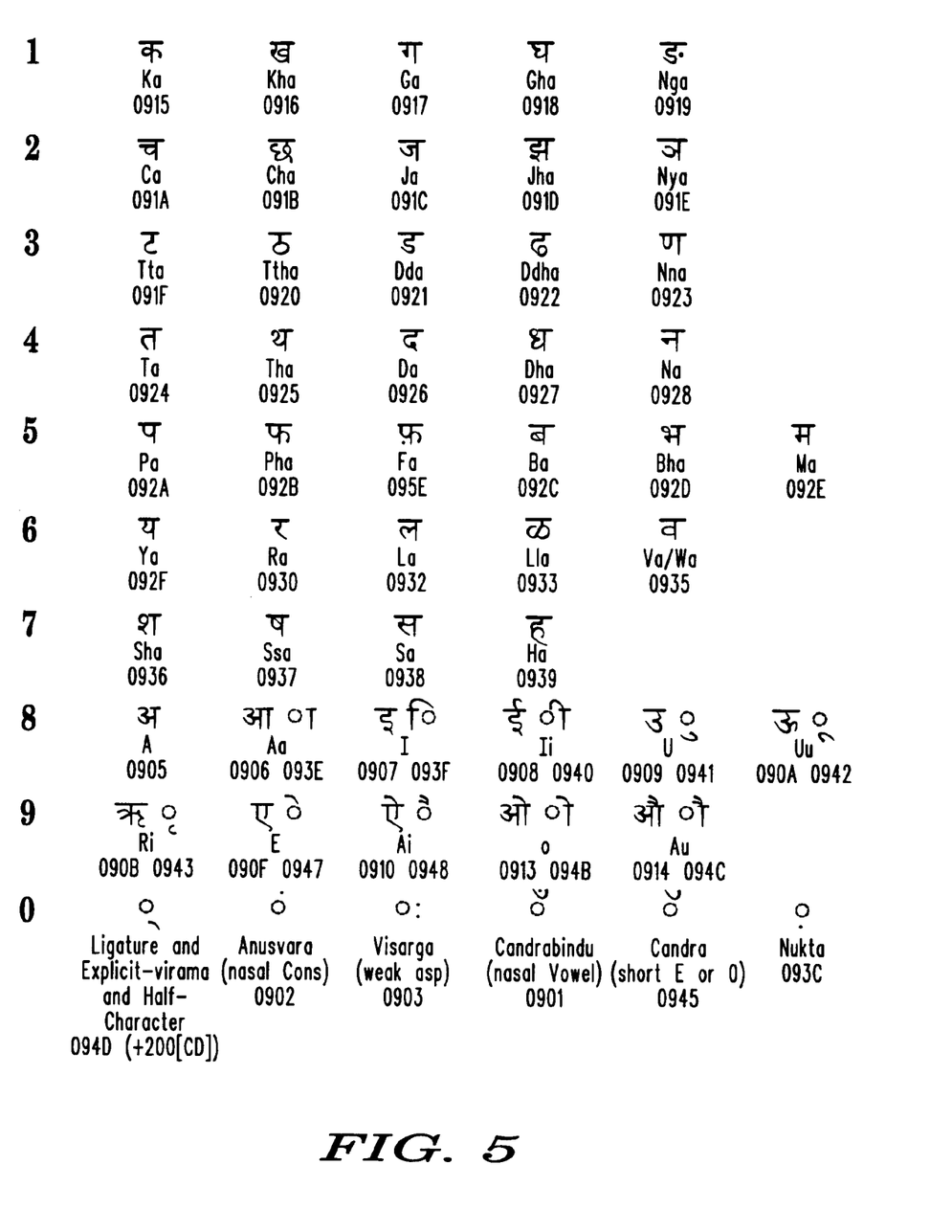
FIG. 5 shows an example of a Devanagari script mapped to a reduced keypad.

FIG. 1 shows an example of an electronic device 100 with a display 160 and reduced keypad 110 for the intermediate code and electronic device therefor. This electronic device 100 is configured for entering Devanagari letters as shown in FIG. 5, but it can be used to enter other alphabets including other Indic scripts as well as Romanized alphabets. The electronic device is especially useful for entering characters from alphabets that include ligatures and other modified characters.

Figure 4:
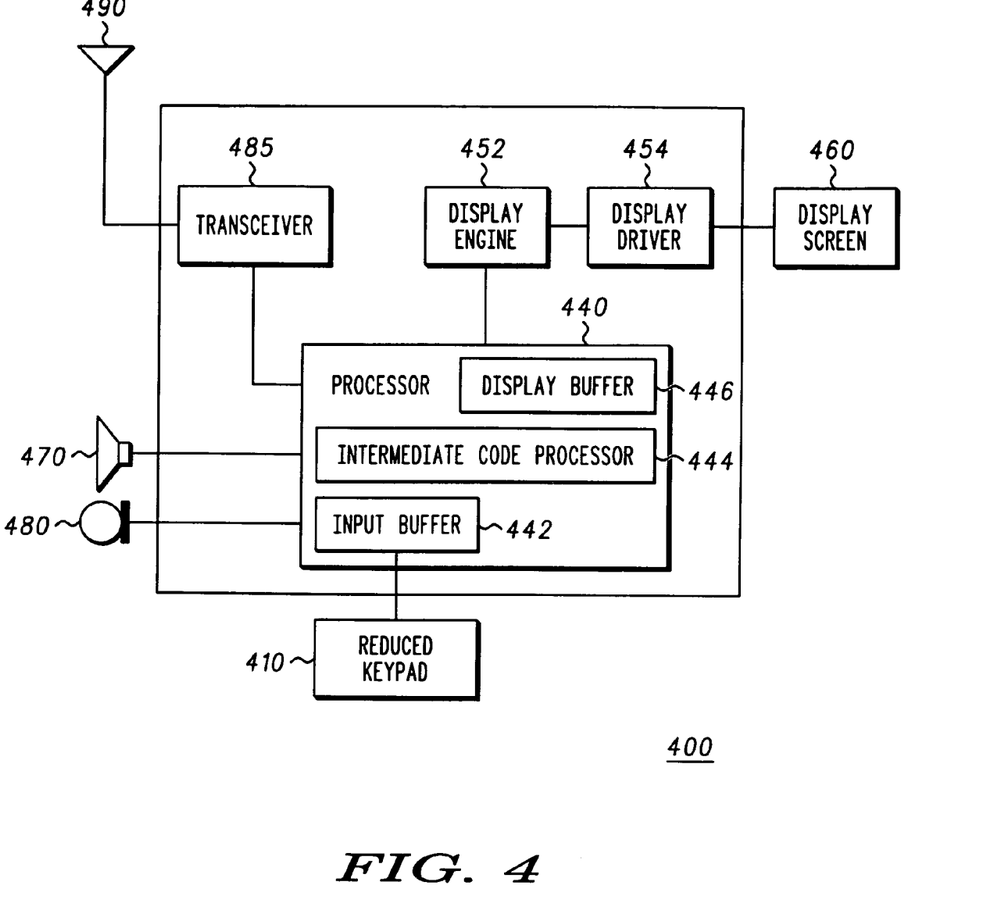
FIG. 4 shows a schematic diagram of the electronic device with a display and reduced keypad shown in FIG. 1 configured with a multi-tap character entry user interface.

The electronic device 100 shown is a mobile telephone with an antenna 190, audio speaker 170, and microphone 180. The electronic device also includes various processors, memory, and other electronic components as shown in FIG. 4. Alternate electronic devices with displays and reduced keypads that can embody the intermediate code and electronic device therefor are landline telephones, cordless telephones, personal digital assistants (PDAs), alphanumeric pagers, laptop computers, desktop computers, remote controllers, and other electronic devices that enable character entry using reduced keypads.

The electronic device 100 shown has ten keys 121, 122, 123, 124, 125, 126, 127, 128, 129, 130 with associated Devanagari letters on a reduced keypad 110. For example, key 121 shows the letters क(Ka) and ङ(Nga), which indicate that the Devanagari letters from क(Ka) through ङ(Nga), which are क(Ka), ख(Kha), ग(Ga), घ(Gha), and ङ(Nga), are represented cyclically by pressing the key 121. This is similar to pressing the "2" key on a telephone keypad once to get an "A", twice to get a "B", a third time to get a "C", a fourth time to get a "2", and where further presses of the "2" key will cycle through "A", "B", "C", and "2".

Other electronic devices may have fewer or more keys and different letter-to-key associations to represent the target alphabet, depending on the application of the electronic device and the target alphabet used. The reduced keypad, however, is typified by its need to use multiple keystrokes to create certain characters. Multiple keystrokes can be implemented by pressing a single key multiple times to obtain a desired character (such as pressing a "2" key once for an "A," twice for a "B," and three times for a "C") or pressing two different keys sequentially to obtain a desired character, or a combination of the foregoing. For example, Indic ligatures require multiple keystrokes—sometimes requiring pressing a single key multiple times, as well as pressing multiple keys—to create a single ligature using a reduced keypad.

Note that key 130 shows the signs ्(Virama), ः(Visarga), and ँ(Candrabindu), which indicate the Indic signs for ्Virama, ंAnusvara, ःVisarga, ँCandrabindu, ॅCandra, and ़Nukta. Additionally, the virama sign indicates three functions: Ligature (Lig: forming a letter from a combination of two or more basic letters as described earlier), Explicit Virama (EV: where a virama is explicitly shown), and Half-Character (HC: a half form of a character, which is often a first portion of a ligature). The separation of the virama sign into three functions is explained in further detail below.

Figure 2:
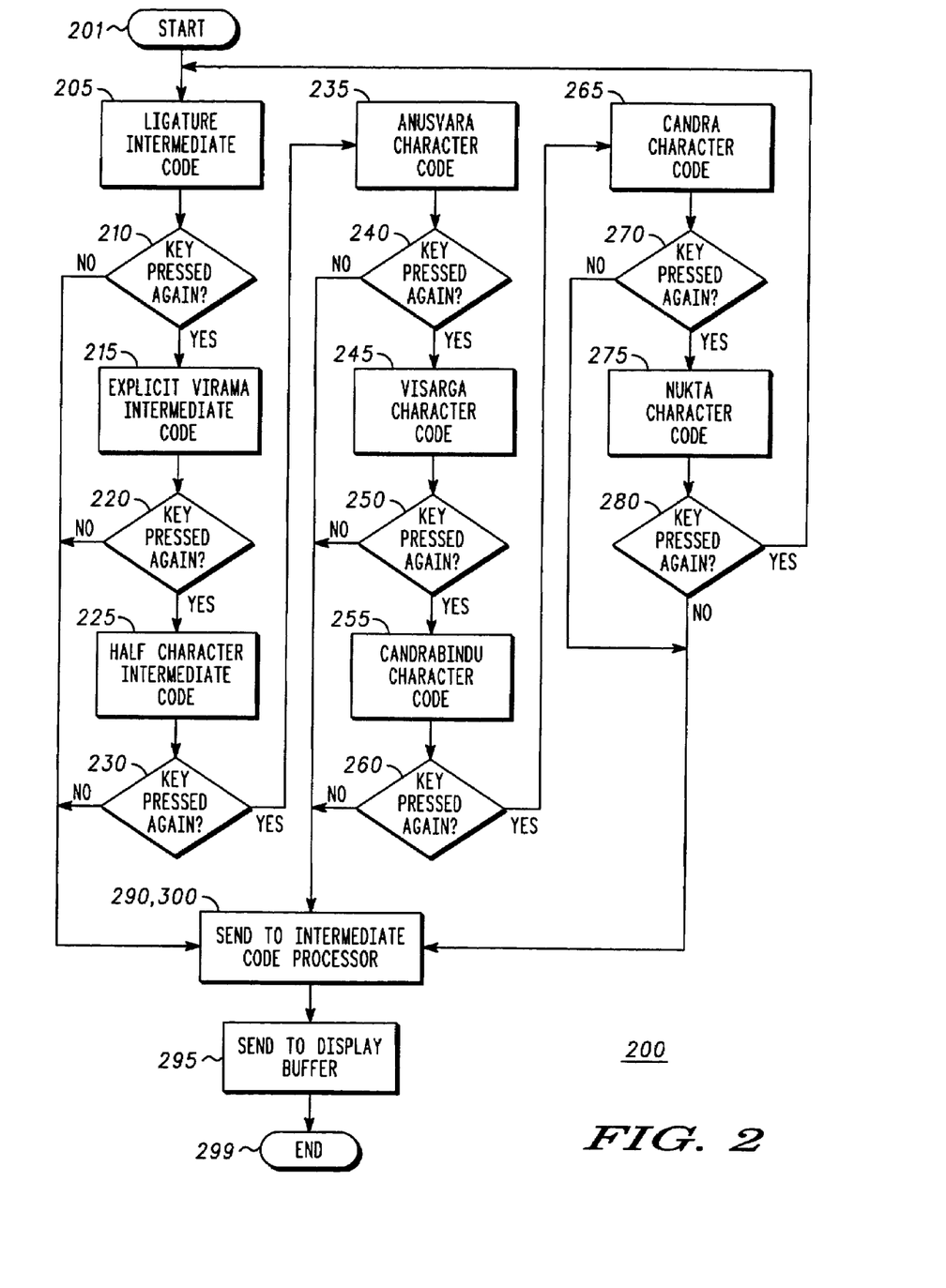
FIG. 2 shows a flowchart of a method for encoding Indic ligatures.

FIG. 2 shows a flowchart 200 of a method for encoding Indic ligatures. This flowchart shows using intermediate codes and an intermediate code processing routine in conjunction with existing Unicode or ISCII script standards to create an intuitive user interface for character entry on a numeric keypad. This method is preferably implemented using a software program. The Devanagari alphabet is used as an example here, but the method can easily be adapted to other Indic scripts and other alphabets.

The method starts in step 201 with the pressing of a predetermined key, such as the key 130 shown in FIG. 1. In this example, the key is associated with the Indic signs for ्Virama, ंAnusvara, ःVisarga, ँCandrabindu, ॅCandra, and ़Nukta. Furthermore, the virama sign indicates three functions: Ligature, Explicit Virama, and Half-Character. Note that the single key 130 in this example can be differentiated into multiple keys. For example, there might be a first key for the three functions of Ligature, Explicit Virama, and Half-Character, a second key for the three signs of Anusvara, Visarga, and Candrabindu, and a third key for Candra and Nukta. The assignment of functions or characters to keys depends on the available space for keys and the target alphabet being implemented on the electronic device.

After the key is pressed, a Ligature intermediate code is entered into a temporary input memory buffer in step 205. If step 210 determines that the same key is pressed again, step 215 changes the code in the temporary input memory buffer to an Explicit Virama intermediate code. If step 220 determines that the same key is pressed yet another time, step 225 changes the code in the temporary input memory buffer to a Half-Character intermediate code.

If step 230 determines the same key is pressed again, step 235 changes the code in the temporary input memory buffer to a character code for the Anusvara sign, which is Unicode code 0902 or ISCII code A2. If step 240 determines the key is pressed again, step 245 changes the code in the temporary input memory buffer to the character code for the Visarga sign, which is Unicode code 0903 or ISCII code A3. If step 250 determines the same key is pressed yet again, step 255 changes the code in the temporary input memory buffer to the character code for the Candrabindu sign, which is Unicode code 0901 or ISCII code A1. If step 260 determines the key is pressed again, step 265 changes the code in the temporary input memory buffer to the character code for the Candra sign, which is Unicode code 0945 or ISCII code E3. If step 270 determines the same key is pressed again, step 275 changes the code in the temporary input memory buffer to the character code for the Nukta sign, which is Unicode code 093C or ISCII code E9. Finally, if step 280 determines that the key is pressed another time, the method cycles back to step 205.

Note that intermediate codes are entered into the temporary input memory buffer during steps 205, 215, and 225 of the method while character codes are entered into the temporary input memory buffer during steps 235, 245, 255, 265, and 275. If the same key is not pressed again, then step 290 sends the character codes to an intermediate code processor for processing of any intermediate codes. Once the intermediate codes are processed, the results are sent to a display buffer in step 295 before the method ends in step 299.

A display engine takes the character codes in the display buffer and builds characters on a display screen of an electronic device in accordance with known techniques.

Figure 3:
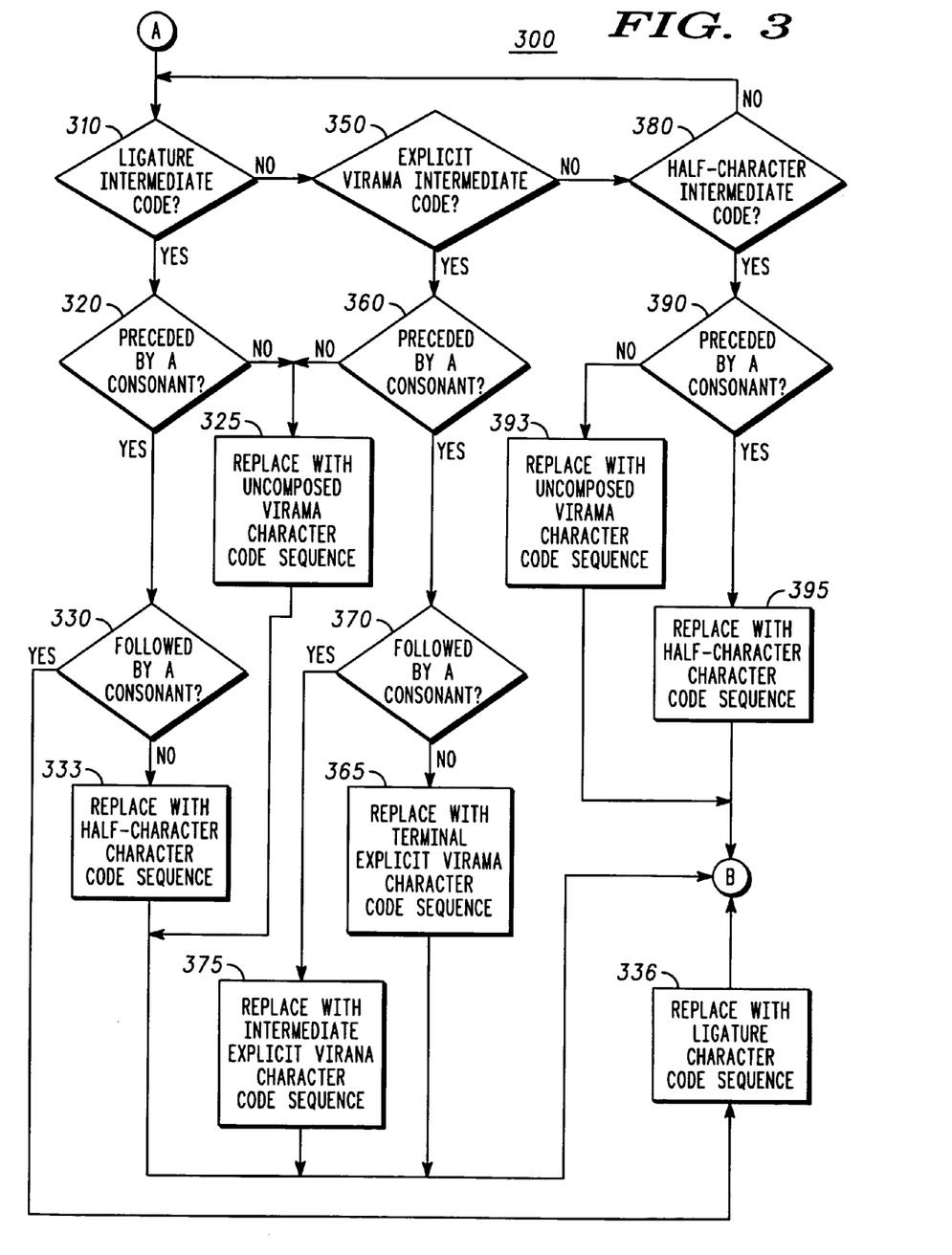
FIG. 3 shows a flowchart for an intermediate code processing portion of the method for encoding Indic ligatures shown in FIG. 2.

FIG. 3 shows a flowchart 300 for an intermediate code processing portion of the method for encoding Indic ligatures shown in FIG. 2. This portion of the method occurs when an intermediate code is in the temporary input memory buffer and the same key is not pressed again, which indicates that a user has selected the function represented by that intermediate code. If step 310 determines that a Ligature intermediate code is in the temporary input memory buffer, then step 320 determines whether the Ligature intermediate code is preceded by a character code representing a consonant.

If the Ligature intermediate code is preceded by a consonant, step 330 determines if the Ligature intermediate code is followed by a character code representing a consonant. In Indic scripts, a ligature is created from two or more consonants. Thus, if the Ligature intermediate code is both preceded and followed by a consonant, step 336 changes the Ligature intermediate code to a Ligature character code sequence (e.g., Unicode code 094D or ISCII code E8) that, in conjunction with the preceding consonant character code and the following consonant character code passed to a display buffer, will produce a ligature on a display screen.

If the Ligature intermediate code is preceded by a consonant, as determined by step 320, but not followed by a consonant, as determined by step 330, the Ligature intermediate character will be replaced in step 333 by a Half-Character character code sequence (e.g., Unicode codes 094D 200D or ISCII codes E8 D9), which forms a half character form of the preceding consonant.

If no following letter has been received, step 330 determines that the ligature intermediate code is not followed by a consonant. Thus, a Half-Character character code sequence (e.g., Unicode codes 094D 200D or ISCII codes E8 D9) shows a half character form of the preceding consonant on the display. Because the vast majority of ligatures begin with the half-form of the first consonant in the ligature, the displayed half character is intuitive to an Indic user.

If the Ligature intermediate code is not preceded by a consonant, as determined in step 320, step 325 changes the Ligature intermediate code to an Uncomposed Virama character code sequence (e.g., Unicode code 094D or ISCII code E8). If the preceding character code in a display buffer did not represent a consonant, an Uncomposed Virama character code sequence in a display buffer would cause the display of a blank explicit virama character (्) indicating that the virama could not compose on the preceding character. Ligatures can only be formed by consonants, so the blank explicit virama character on the display screen would indicate to the user that a keypress error has occurred.

If the intermediate code in the temporary input memory buffer is not a Ligature intermediate code, step 350 determines if it is an Explicit Virama intermediate code. If step 350 determines that an Explicit Virama intermediate code is in the temporary input memory buffer, step 360 determines if the Explicit Virama intermediate code is preceded by a character code representing a consonant. If the Explicit Virama intermediate code is preceded by a consonant, step 370 determines if the Explicit Virama intermediate code is followed by a character code representing a consonant. If an Explicit Virama intermediate code is both preceded and followed by consonants, then step 375 changes the intermediate code to an Intermediate Explicit Virama character code sequence (e.g., Unicode codes 094D 200C or ISCII codes E8 E8). Because the user has selected an Explicit Virama function, it is understood that the user does not want a ligature—even if the explicit virama is intermediately situated between two consonants that could form a ligature.

If the Explicit Virama intermediate code is preceded by a consonant and not followed by a consonant, as determined by step 360 and step 370, step 365 replaces the Explicit Virama intermediate code with a Terminal Explicit Virama character code sequence (e.g., Unicode code 094D or ISCII code E8). If, in a display buffer, the character code preceding a Terminal Explicit Virama character code sequence (e.g., Unicode code 094D or ISCII code EB) represents a consonant, a display screen would display a consonant with an explicit virama.

Otherwise, if the Explicit Virama intermediate code is not preceded by a consonant, as determined by step 360, step 325 replaces the intermediate code with an Uncomposed Virama character code sequence. If, in a display buffer, the character code preceding the Uncomposed Virama character code sequence (e.g., Unicode code 094D or ISCII code E8) does not represent a consonant, a display screen would display a blank explicit virama character ्  indicating that the virama could not compose on the preceding character.

If step 370 determines that the Explicit Virama intermediate code is not followed by a consonant because no following letter has been received, step 365 replaces the Explicit Virama intermediate code with a Terminal Explicit Virama character code sequence (e.g., Unicode code 094D or ISCII code E8). The Terminal Explicit Virama character code sequence is appropriate when an Explicit Virama intermediate code is situated at the end of a word as it is presently entered.

If step 350 determines that the intermediate code is not for an Explicit Virama, then step 380 determines if it is a Half-Character intermediate code. Step 390 then determines if the Half-Character intermediate code is preceded by a character code representing a consonant. If the Half-Character intermediate code is preceded by a consonant, step 395 changes the Half-Character intermediate code to a Half-Character character code sequence (e.g., Unicode codes 094D 200D or ISCII codes E8 E9), which will show a half character form of the preceding consonant on the display screen.

If step 390 determines that the Half-Character intermediate code is not preceded by a consonant, step 393 changes the Half-Character intermediate code to an Uncomposed Virama character code sequence (e.g., Unicode code 094D or ISCII code E8). Again, this will result in a blank explicit virama character ्  on the display screen, which indicates that a virama could not compose on the preceding character and suggest a user error situation.

Note that the intermediate code processing portion of the flowchart 300 can be simplified when using the Urticode standard for character codes, because Unicode code 094D either by itself or in combination with another character code, is used in the display engine for ligature formation, explicit virarna character formation, and half character formation. In other words, when implementing the method of flowchart 300 using the Unicode standard, Unicode code 094D is present in not only the Ligature character code sequence, but also the Uncomposed Virama character code sequence, Half-character code sequence, the Intermediate Explicit Virama character code sequence, and the Terminal Explicit Virama character code sequence. Similarly, the ISCIJ code E8 either by itself or in combination with another character code, is used in the display engine for ligature formation, explicit virama character formation, and half character formation. Other display engines, however, may use or re-use individual character codes differently. We have purposely refrained from further simplification of the flowchart 300 to allow easier application of the method to other script standards.

FIG. 4 shows a schematic diagram 400 of the electronic device with a display and reduced keypad shown in FIG. 1 configured with a multi-tap character entry user interface. The electronic device is shown is a mobile telephone with an antenna 490, transceiver 485, microphone 480, and audio speaker 470. A reduced keypad 410 accepts keypresses, which are recorded in an input buffer 442 of a processor 440 with memory. These keypresses include character codes and intermediate codes. An intermediate code processor 444 within the processor 440 with memory evaluates any intermediate codes in the input buffer 442 in light of any surrounding character codes, and the intermediate code processor 444 changes the intermediate codes into character codes in accordance with a predetermined method such as the one described in conjunction with FIG. 2 and FIG. 3. The character codes are sent to a display buffer 446 of the processor 440 with memory. A display engine 452 coupled to the processor 440 with memory reads the contents of the display buffer 446 and controls a display driver 454 to map the character codes onto a display screen 460 of the electronic device.

The electronic device with a display and reduced keypad shown in FIG. 1 can also be configured with a predictive word entry user interface.

FIG. 5 shows an example of a Devanagari script mapped to a reduced keypad. There are many examples of mapping a Devanagari script to a reduced keypad, and this a simply one of many possibilities. The reduced keypad uses at least ten keys, representing the numerals 0, 1, 2, 3, 4, 5, 6, 7, 8, and 9, and the keypad associates individual Devanagari letters with one of the ten keys. The letters क(Ka), ख(Kha), ग(Ga), घ(Gha), and ङ(Nga) are associated with the number "1" key. When in character entry mode, pressing the number "1" key once results in a क on the display screen. Pressing the number "1" key against results in a ख(Kha) on the display screen. Further presses of the "1" key cycle through the remaining letters until the sixth consecutive press of the "1" key causes a number 1 to show on the display screen, and the seventh consecutive press returns the display back to a क.

The same principle applies to the remaining keys of the reduced keypad. As described earlier, a number "0" key shows the signs ्(Virama), ः(Visarga), and ँ(Candrabindu), which indicate the Indic signs for ्Virama, ंAnusvara, ःVisarga, ँCandrabindu, ॅCandra, and ़Nukta. Additionally, the virama sign indicates three functions: Ligature, Explicit Virama, and Half-Character.

Figure 6:
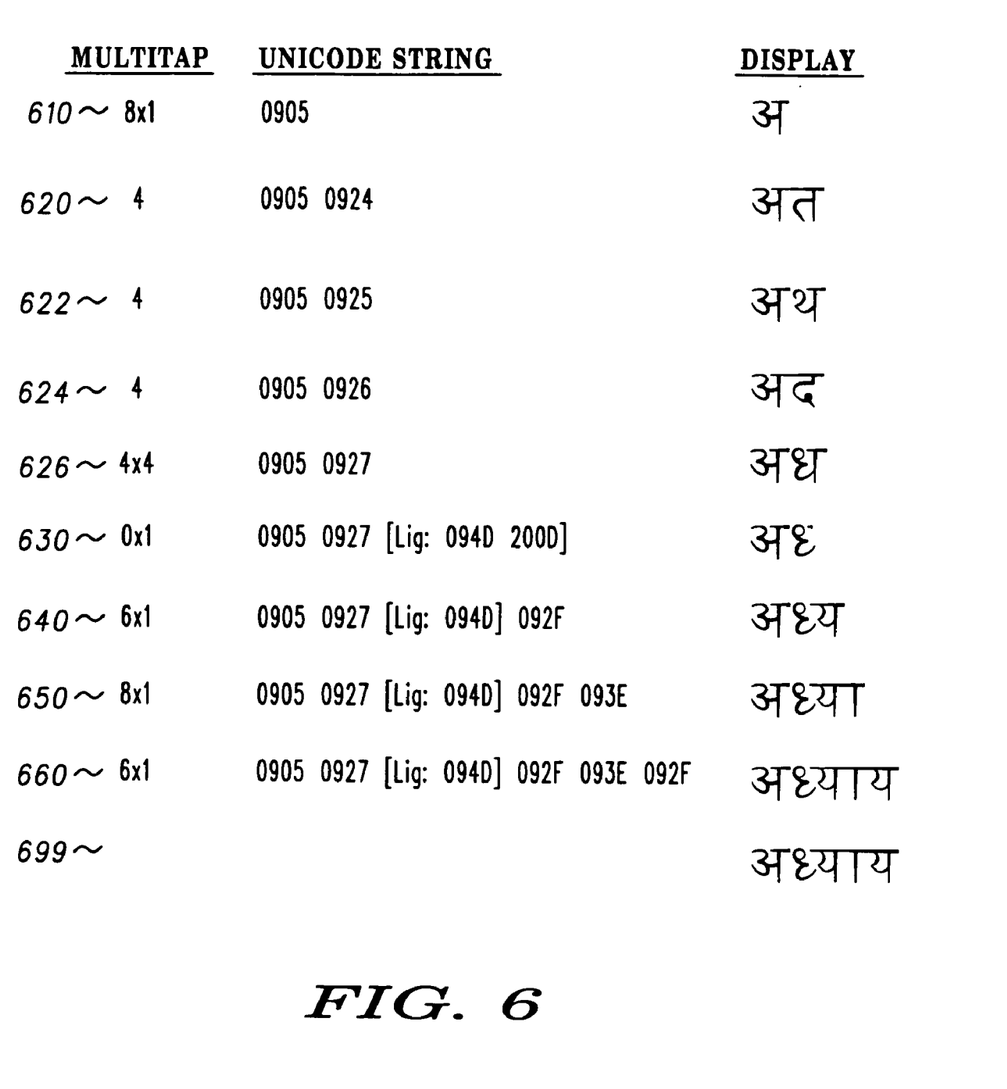
FIG. 6 shows an example using the Ligature intermediate code for a multi-tap character entry user interface.

FIG. 6 shows an example using the Ligature intermediate code for a multi-tap character entry user interface. This example can also be applied to a predictive word entry user interface. In this demonstration, we will use the electronic device 100 in FIG. 1 and the reduced keypad mapping shown in FIG. 5. As shown in line 610, pressing the "8" key once results in the selection of अ(A) with the display screen showing अ(A) when using a multi-tap character entry user interface. For a multi-tap character entry program, a user presses the "4" key four times to cycle through the letters त(Ta), थ(Tha), द(Da), and ध(Dha) as shown in lines 620, 622, 624, and 626.

Line 630 shows a user pressing the "0" key once to select a Ligature function. Because the method described with reference to FIG. 3 knows that the Ligature intermediate code is preceded by a consonant and is presently not followed by a consonant (i.e., the next letter has not yet been entered), the Ligature intermediate code is changed to a Half-Character character code sequence (e.g., Unicode codes 094D 200D), which results in a half character form (ध्) of the preceding consonant on the display screen. This is an expected behavior, because the complete ligature will be formed from the half character and the character to be entered next as shown in line 640.

In line 640, a user has pressed the "6" key to build the second half of the ligature, which is formed from the ध(Dha) and य(Ya) characters to form ligature ध्य. The method described with reference to FIG. 3 re-evaluates the position of the Ligature intermediate code, finds that it is both preceded and followed by a consonant, and replaces the Half-Character character code sequence with a Ligature character code sequence (e.g., Unicode code 094D).

Line 650 and line 660 show completion of the word by pressing the "8" key for selecting the script ा(Aa), which modifies the preceding consonant, and pressing the "6" key for selecting the character य(Ya). The completed word अध्याय is shown in line 699.

The method uses a Ligature intermediate code that converts to a Half-Character character code sequence to produce a half character form of the preceding consonant, which is expected by the user. Once the following consonant is entered, the Half-Character character code sequence is converted to a Ligature character code sequence. Using conventional methods, the preceding consonant of a ligature would have been shown with an explicit virama ध् and then, after the following consonant of the ligature was entered, the ध् would be replaced by the ligature ध्य. Thus, the conventional method results in a non-intuitive appearing and disappearing diacritic mark. The present method avoids this appearing and disappearing diacritic mark issue by using intermediate codes and converting the intermediate codes to character code sequences depending on the context of the intermediate codes.

Figure 7:
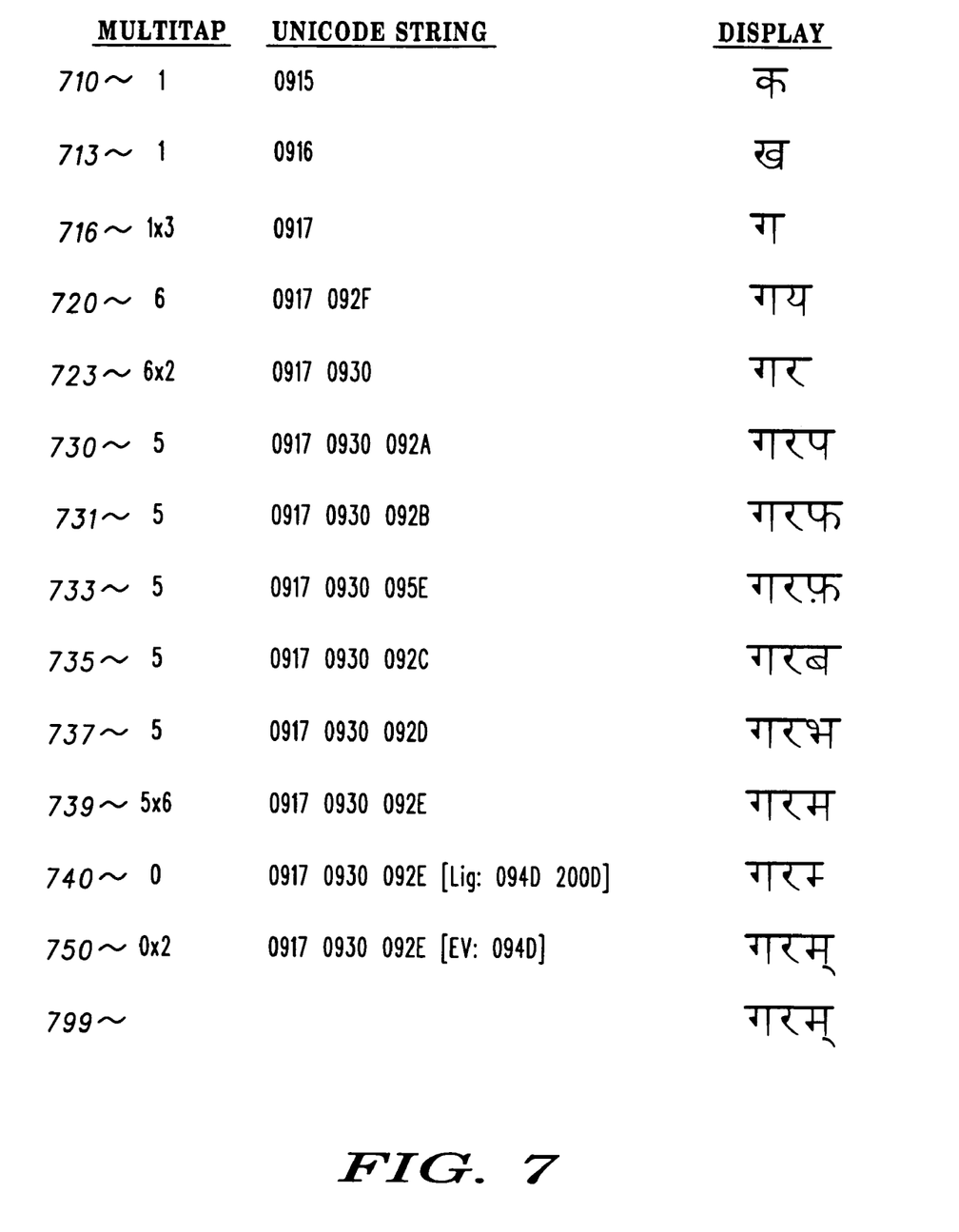
FIG. 7 shows an example using the Explicit Virama intermediate code for a multi-tap character entry user interface.

FIG. 7 shows example using the Explicit Virama intermediate code for a multi-tap character entry user interface. This example can also be applied to a predictive word entry user interface. In this example, we will use the electronic device 100 in FIG. 1 and the reduced keypad mapping shown in FIG. 5. As shown in lines 710, 713, and 716, pressing the "1" key three times will cycle through the characters क(Ka), ख(Kha), and ग(Ga) when using a multi-tap character entry user interface.

Line 720 and line 723 represent pressing the "6" key twice when using a multi-tap character entry user interface. Lines 730, 731, 733, 735, 737, and 739 represent pressing the "5" key six times when using a multi-tap user interface.

Line 740 shows pressing the "0" key once, which selects a Ligature function. According to FIG. 3 and its accompanying text, because the Ligature intermediate code is preceded by a consonant but not necessarily followed by a consonant (i.e., the next character has not been entered), the Ligature intermediate code is changed to a Half-Character character code sequence (e.g., Unicode codes 094D 200D), which creates on a display screen a half character form of the preceding consonant म्.

Line 750 shows pressing the "0" key again to select an Explicit Virama function. According to the method shown in FIG. 3, the Explicit Virama intermediate code is changed to a Terminal Explicit Virama character code sequence (e.g., Unicode code 094D), which creates on a display screen an explicit virama on the preceding consonant म् .

The completed word गरम् is shown in line 799. Although this word is misspelled, it shows the different behaviors of the Ligature intermediate code and the Explicit Virama intermediate code. In order to obtain the consonant with an explicit virama म्(M) using a conventional method, the Terminal Explicit Virama character code sequence is used in conjunction with the preceding consonant. The conventional method, however, does not differentiate between an explicit virama and the start of a ligature. This is confusing to a user, and the intermediate code clears up this confusion by creating different display screen feedback characters for explicit virama and the beginning of a ligature.

Figure 8:
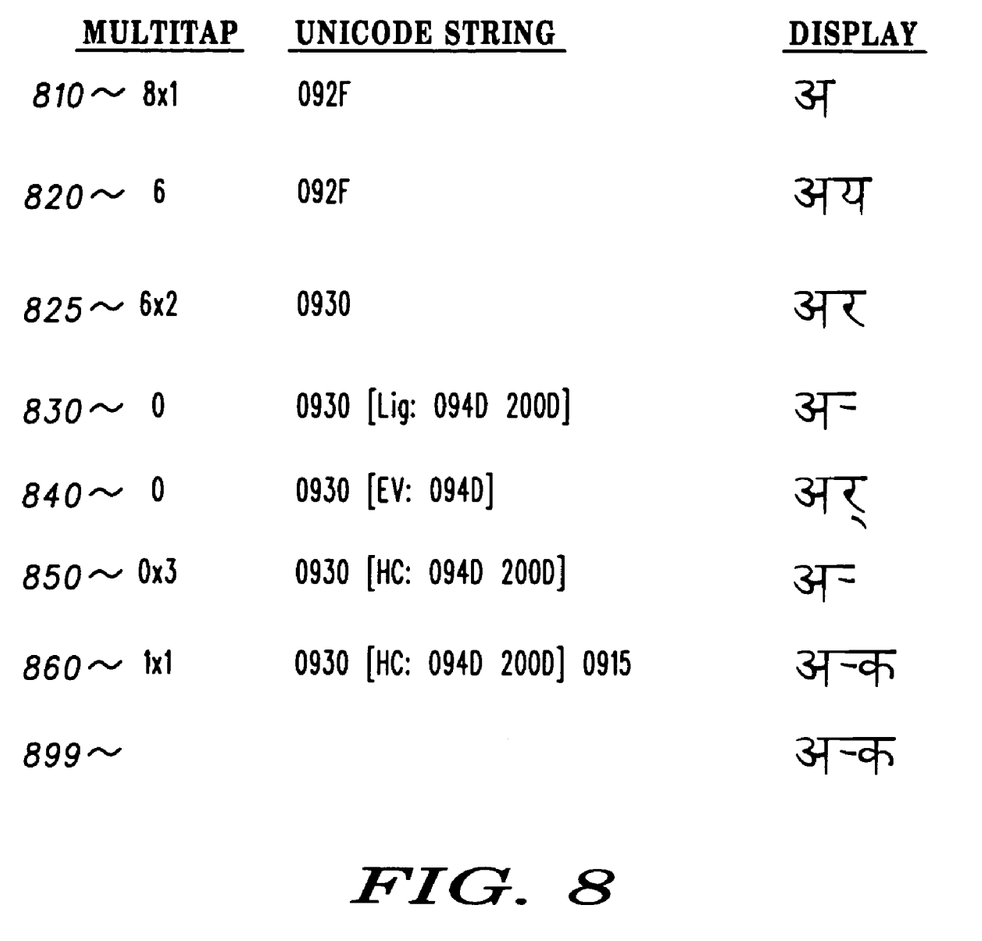
FIG. 8 shows an example using the Half-Character intermediate code for a multi-tap character entry user interface.

FIG. 8 shows an example using the Half-Character intermediate code for a multi-tap character entry user interface. This example can also be applied to a predictive word entry user interface. In this example, we will use the electronic device 100 in FIG. 1 and the reduced keypad mapping shown in FIG. 5. Line 810 shows selecting the अ(A) character by pressing the "8" key once in multi-tap character entry user interface.

Line 820 and line 825 show pressing the "6" key twice to cycle through the य(Ya) character to select the र(Ra) character.

Line 830 shows pressing the "0" key once, which produces a Ligature intermediate code. According to FIG. 3 and its accompanying text, because the Ligature intermediate code is preceded by a consonant but not necessarily followed by a consonant (i.e., the next character has not been entered), the Ligature intermediate code is changed to a Half-Character character code sequence (e.g., Unicode codes 094D 200D), which creates on a display screen a half character form of the preceding consonant ्.

Line 840 shows pressing the "0" key again, which produces an Explicit Virama intermediate code. The Explicit Virama intermediate code is changed to a Terminal Explicit Virama character code, in accordance with the method shown in FIG. 3, which creates on a display screen an explicit virama on the preceding consonant र् .

Line 850 shows pressing the "0" key a third time to select a Half-Character intermediate code. According to the method shown in FIG. 3, the Half-Character intermediate code is changed to a Half-Character character code sequence (e.g., Unicode codes 094D 200D), which creates on a display screen a half character form of the preceding consonant ्.

Line 860 completes the word by pressing the "1" key once to append the क(Ka) character to the preceding half character to result in र्क. Line 899 shows the completed word अर्क.

Note that a half character is produced on the display screen either by pressing the "0" key once for the Ligature function or three times for the Half-Character function. If the Ligature function is used to produce a half character on the display screen, and a valid following consonant such as क(Ka) is entered, the half character will be appended with the following consonant to produce a ligature क्ष instead of retaining the half character form with a क(Ka), र्क.

Thus, the intermediate code and electronic device therefor provides an intuitive interface to enter characters and words into an electronic device.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

The terms "a" or "an," as used herein, are defined as one or more than one. The term "plurality," as used herein, is defined as two or more than two. The term "another," as used here, is defined as at least a second or more. The terms "including," "comprising," and/or "having," as used herein, are defined as a non-exclusive inclusion (i.e., open language). The term "coupled," as used herein, is defined as connected, although not necessarily directly and not necessarily mechanically.

The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

I claim:

1. A method for character entry comprising the steps of:
   entering a first character code into a memory buffer;
   entering a Ligature intermediate code into the memory buffer;
   entering a second character code into the memory buffer;
   changing the Ligature intermediate code to one or more character codes; and
   using a display engine to display one or more characters represented by the first character code, the one or more character codes and the second character code.

2. A method according to claim 1 wherein the step of changing the Ligature intermediate code comprises the steps of:
   converting the Ligature intermediate code into a Uncomposed Virama charader code sequence, if the first character code does not represent a consonant;
   converting the Ligature intermediate code into a Ligature character code sequence, if the first character code represents a consonant and the second character code represents a consonant; and
   converting the Ligature intermediate code into a Half-Character character code sequence, if the first character code represents a consonant and the second character code does hot represent a consonant.

3. A method for character entry comprising the steps of:
   entering a first character code into a memory buffer;
   entering an Explicit virama intermediate code into the memory buffer;
   entering a second character code into the memory buffer;
   changing the Explicit Virama intermediate code to one or more character codes; and
   using a display engine to display one or more characters represented by the first character code, the one or more character codes, and the second character code.

4. A method according to claim 3 wherein the step of changing the Explicit Virama intermediate code comprises the steps of:
   converting the Explicit Virama intermediate code into an Uncomposed Virama character code sequence, if the first character code does not represent a consonant;
   converting the Explicit Virama intermediate code into a Intermediate Explicit Virama character code sequence, if the first character code represents a consonant and the second character code represents a consonant; and
   converting the Explicit Virama intermediate code into a Terminal Explicit Virama character code sequence, if the first character code represents a consonant and the second character code does not represent a consonant.

5. A method for character entry comprising the steps of:
   entering a first character code into a memory buffer;
   entering a Half-character intermediate code into the memory buffer;
   entering a second character code into the memory buffer;
   changing the Half-Character intermediate code to one or more character codes; and
   using a display engine to display one or more characters represented by the first character code, the one or more character codes, and the second character code.

6. A method according to claim 5 wherein the step of changing the Half-Character intermediate code comprises the steps of:
   converting the Half-Character intermediate code into an Uncomposed Virama character code sequence, if the first character code does not represent a consonant; and
   converting the Half-Character intermediate code into a Half Character character code sequence, if the first character code does represent a consonant.

\* \* \* \* \*